3,733,337
DIAMINO-XANTHENE (OR THIOXANTHENE)-
SPIRODIBENZOPYRANES
Heinz Balli, Riehen, and Ulf Krueger, Binningen, Switzerland, assignors to Ciba-Geigy AG, Basel, Switzerland
No Drawing. Filed Dec. 16, 1970, Ser. No. 98,879
Claims priority, application Switzerland, Dec. 23, 1969, 19,172/69; Nov. 3, 1970, 16,229/70
Int. Cl. C07d 7/42, 65/16
U.S. Cl. 260—328                                7 Claims

ABSTRACT OF THE DISCLOSURE

A 3',6'-diamino-xantheno (or thioxantheno)-9'-spiro-6-dibenzo-[b,d]-pyrane compound of General Formula 1

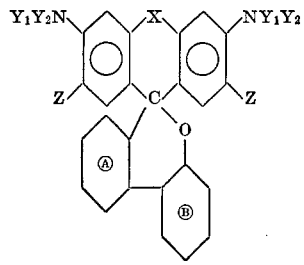

(1)

wherein X represents an oxygen atom or a sulphur atom, $Y_1$ and $Y_2$, which may be the same or different, each represents an alkyl or aryl radical and Z represents a hydrogen atom or an alkyl group, and wherein the benzene rings A and B may contain alkyl groups, halogen atoms and sulphonic acid groups as substituents.

---

The present invention provides 3',6'-diamino-xantheno (or thioxantheno)-9'-spiro-6-dibenzo-[b,d]-pyrane compounds of the General Formula 1

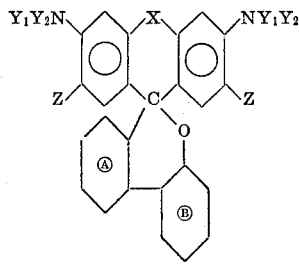

(1)

wherein X represents an oxygen atom or a sulphur atom, $Y_1$ and $Y_2$, which may be the same or different, each represents an alkyl or aryl radical and Z represents a hydrogen atom or an alkyl group, and wherein the benzene rings A and B may contain alkyl groups, halogen atoms and sulphonic acid groups, as substituents.

As examples of the substituents represented by $Y_1$ and $Y_2$ there may be considered simple aryl radicals, for example a phenyl radical, but also substituted aryl radicals, for example a tolyl radical. Possible alkyl radicals are straight-chain or branched, chiefly alkyl radicals which have low molecular weight, especially a methyl radical. The substituents represented by Z may be alkyl radicals that are straight-chain or branched and especially those having a low molecular weight, for example a methyl radical. Z preferably represents a hydrogen atom. The substituents which may be present in the benzene rings A and B may be straight-chain or branched alkyl preferably those of low molecular weight, for example an ethyl or chloromethyl group, a chlorine, bromine or iodine atom or a sulphonic acid group. The possible substituents in rings A and B may be in various positions. However, the rings A and B are preferably unsubstituted.

Compounds of special interest are, therefore those of the General Formula 2

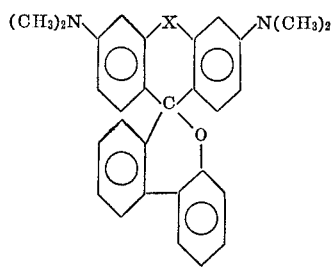

(2)

wherein X represents an oxygen or sulphur atom.

The invention also provides a process for the manufacture of a compound of the General Formula 1, which comprises reacting a xanthylium or thioxanthylium) salt of the General Formula 3

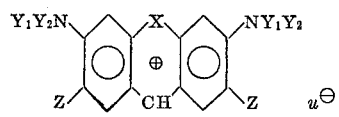

(3)

with a Grignard compound of General Formula 4

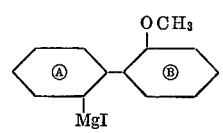

(4)

wherein X, $Y_1$, $Y_2$ and Z have the meanings given for General Formula 1, rings A and B may be unsubstituted or substituted as for General Formula 1, and $u^\ominus$ represents an anion, for example a perchlorate ion, oxidising the resulting product, splitting the ether at the methoxy group and treating with alkali.

The reaction with the Grignard compound takes place in a known manner in an organic solvent, for example tetrahydrofurane or preferably methylene chloride. The xanthylium (or thioxanthylium) salt used as the starting substance is preferably suspended in methylene chloride. A corresponding Li-organic compound can be used instead of the Grignard compound, with equally satisfactory results. Oxidising agents that may be used are, for example, air, a nitrite, triphenylchloromethane and especially chloranil (which is advantageously used in benzene solution). The oxidation is preferably carried out at a somewhat elevated temperature, for example 50 to 70° C. Chloroform, acetone and especially dimethylformamide are suitable as solvents for the oxidised product. The splitting of the ether also takes place in a known manner, for example with hydrogen iodide or hydrogen bromide in glacial acetic acid solution, or with boron trichloride, boron tribromide or aluminium trichloride.

The ether-splitting using hydrogen iodide takes place very smoothly, and the xanthene (or thioxanthene) compound is iodized at the same time. If boron tribromide is used, a bromination can take place at the benzene ring B. This reaction also takes place smoothly and with a good yield. The ether-splitting with hydrogen bromide takes place more slowly than with hydrogen iodide, but in the process no bromine is introduced into the xanthene (or thioxanthene) molecule. The ether-splitting is carried out at about 130 to 150° C. if hydrogen iodide or hydrogen bromide is used. If boron tribromide is used, the splitting takes place at room temperature. Any excess hydrogen halide and glacial acetic acid may be subsequently neutralised with sodium hydroxide solution, and any excess boron tribromide is hydrolysed. The mixture of the resulting xanthene (or thioxanthene) compounds may be taken up in ether. If the desired xanthene (or thioxanthene) compound is required in a pure form, it is necessary to separate it from the mixture and subsequently to purify it. Chromatography is an advisable method of separation, especially preparative layer chromatography, which is carried out in a known manner with a solvent mixture, for example benzene ether, or with a pure solvent, for example chloroform, as the running agent.

Reaction of the resulting xanthene (or thioxanthene) salt with alkali, for example sodium hydroxide solution, will yield the desired xanthene (or thioxanthene) compound, which can subsequently be purified by recrystallisation from a solvent, for example cyclohexane.

The compounds of the invention of General Formula 1 show, in solution, the property of "cryochromic behaviour" which is the converse of the known phenomenon of "thermochromic behaviour." They are colourless at ordinary temperature, for example room temperature, and assume a colour on cooling, for example to a temperature of between 0° and —80° C., which colour becomes increasingly deeper as the temperature is lowered. The process is reversible, that is to say, on warming to room temperature the colour disappears again and the solution appears colourless. The manifestation of the colour depends on the pH value of the solution, that is to say the temperature at which a certain colour intensity is achieved as a result of cooling can be changed by changing the pH value.

The phenomenon of "cryochromic behaviour" observed in the compounds of the invention is probably attributable to the existence of an equilibrium between the structure represented by General Formula 1 (form I) and the opened form of the pyrane ring at the oxygen atom (form II). The opened form II contains an HO group at the ring B and is coloured, whereas form I is colourless. It is to be understood that although General Formula 1 shows a closed pyrane ring, the claims of this specification are also intended to cover the form with an open pyrane ring, when this form is present, or a mixture of the two forms.

The dependence of the concentrations of each of the two equilibrium forms I and II on the temperature and pH value has been found to be given by the following equation (within a certain pH range):

$$\log \frac{c_{II}}{c_{II(max)} - c_{II}} = a/T - b - \text{pH}$$

wherein $c_{II}$ represents the concentration of form II at the given pH value and temperature, $c_{II(max)}$ represents the maximum concentration of form II, T represents the absolute temperature and $a$ and $b$ are constants, the values of which can be determined empirically.

Irradiation of the coloured solution at low temperature will cause the disappearance of the colour, especially if the radiation is of a short wavelength, for example ultraviolet radiation. As soon as the irradiation is interrupted, the original colour returns.

The speed at which the equilibrium is established, or at which a displaced equilibrium is re-established, that is to say the speed with which a certain colour intensity may be obtained by cooling, or with which a colour can be changed by changing the pH value at constant temperature, or with which a colour will disappear due to irradiation or will re-appear due to interruption of the irradiation, depends mainly on the temperature and can be less than one minute or as much as ten minutes.

The cryochromic behaviour of the compounds of General Formula 1 enables them to be used for measuring or monitoring processes in which changes of temperature, pH value or radiation occur, or for regulating these parameters.

An example of such a use is in measuring temperature distribution or variation of pH value over a large volume, or in measuring heat transmission or conductivity processes. A particularly valuable use of the compounds is their employment (for example in conjunction with a light-measuring device, for example a photocell arrangement) for warning when a particular temperature is obtained, or for temperature measurement and control. The compounds may also be used in radiation warning instruments, or in devices for controlling incident radiation, for example in chemical or biological processes, as a "chemical image-converter" and possibly in devices for energy conversion, for example under extreme temperature conditions.

Further possible uses of the compounds of the invention, resulting from their optical behaviour, are in laser technology, where they can serve as optical switches, for example in the form of a solution which is introduced, in a cell, into the path of the beam of a laser, for producing laser impulses.

For practical use, it is to be regarded as an advantage that the colour of the solution does not appear abruptly on cooling, as it does at the point of change of a titration, but that the intensity increases continuously starting from a completely colourless condition. The cryochromic effect can therefore be utilised for example for measuring or regulating temperature over the entire range in question.

The cryochromic effect can also be utilised if the cryochromic substance is not dissolved in a solvent, but is in a semi-solid or solid form, with the sole proviso that the equilibrium dependent on the pH value can be correctly established. A possible semi-solid form is, for example, a solution or suspension in an electrolyte-conducting gelatin-like composition (for example agar-agar). For use in the solid form, the compound may be potted in certain synthetic resins, for example those which have the character of an ion exchange resin.

EXAMPLE 1

2 g. (5.5 mmols) of pyronine perchlorate are suspended in 100 cc. of dry methylene chloride and 10 cc. of 0.8 molar ethereal 2-methoxy-biphenyl-2'-magnesium iodide solution are added dropwise whilst stirring. After standing for 12 hours at room temperature, 3 cc. of water are added to the reaction mixture, the whole is evaporated to dryness, and the evaporation residue is treated with 20 cc. of a saturated solution of chloranil in benzene, at 60° C. After further evaporation, the residue is taken up in a little dimethylformamide and the resulting dyestuff salt is precipitated with perchloric acid; the salt can be recrystallised from a dimethylformamide-water mixture.

1 g. (1.8 mmols) of the resulting dyestuff salt is dissolved in a mixture of 3 cc. of concentrated hydrobromic acid (48% strength) and 3 cc. of glacial acetic acid, and the solution is heated to 130° C. for 3 hours. The cooled reaction mixture is introduced dropwise into a well-stirred two-phase system of 30 cc. of 2 N sodium hydroxide solution and 30 cc. of ether. Precipitation from the ether phase by means of perchloric acid/sodium perchlorate solution yields a dyestuff mixture which is subjected to preparative layer chromatography on silica gel H, using benzene:ether (8:2), as the running agent.

After isolation of the 9-[(2"-hydroxybiphenyl)-2']-3,6-bis-dimethylamino-xanthylium perchlorate produced as the main product, the spiro compound is obtained from the ethanolic solution of the above dyestuff salt by adding sodium hydroxide solution. The product can be recrystallised from cyclohexane: melting point 200 to 204° C. after drying in a high vacuum. The resulting 3',6'- bis-dimethylamino-xantheno-9'-spiro - 6 - dibenzo - [b,d]-pyrane of the formula

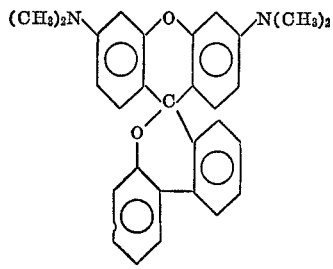

in chloroform shows an absorption maximum (molar extinction coefficient 19,000) at 314 nm. in the UV spectrum. If the corresponding Li-organic compound is used for the manufacturing process in place of the above-mentioned Grignard compound, the same end product is obtained.

An aqueous-ethanolic solution saturated at room temperature with the compound prepared and with disodium hydrogen phosphate, is optionally treated with *a little* sodium hydroxide solution, until any coloration which may have arisen disappears. On cooling this solution to 0 to —80° C., an intensive red coloration ($\lambda$ max.=565 nm.) appears. The colour disappears again on warming the solution to room temperature.

EXAMPLE 2

3.8 g. (10 mmols) of thiopyronine perchlorate are suspended in 20 cc. of dry methylene chloride and 20 cc. of 0.8 molar (16 mmols) ethereal 2-methoxy-bisphenyl-2'-magnesium iodide solution are rapidly added dropwise. The mixture is stirred for a further 3 hours and treated with 3 cc. of water, the solvent is removed, the residue is taken up in 50 cc. of benzene and the leuco compound is oxidised at 60° C. with 20 cc. of a saturated solution of chloranil in benzene.

The resulting dyestuff salt can be precipitated by adding aqueous sodium perchlorate solution containing perchloric acid and can be recrystallised from dimethylformamide.

1.3 g. (2.3 mmols) of the dyestuff salt are left for 24 hours at room temperature in a mixture of 30 cc. of methylene chloride and excess boron tribromide (1.4 cc.). The mixture is diluted with ether and hydrolysed with dilute aqueous sodium hydroxide solution, and the spiropyrane is obtained from the ether phase, after preparative layer chromatography on silica gel PF$_{254}$ (Merck) using chloroform as the running agent, as a colourless crystalline compound of melting point 234 to 236° C. The bromo - 3',6' - bis - dimethylamino-thioxantheno-9'-spiro-6-dibenzo-[b,d]-pyrane obtained, of formula

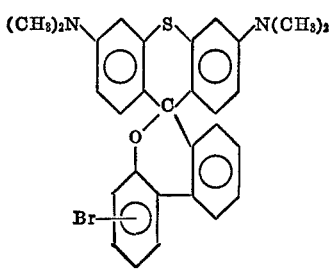

in chloroform shows an absorption maximum (molar extinction coefficient: 14,200) at 318 nm. in the UV spectrum.

An aqueous-ethanolic solution saturated at room temperature with the resulting compound and with disodium hydrogen phosphate is optionally treated with *a little* sodium hydroxide solution until any colour which may have appeared disappears. On cooling this solution to 0 to —80° C., an intensive blue-red colour ($\lambda$ max.=585 nm.) appears. The colour disappears on warming the solution to room temperature.

We claim:
1. A compound of the formula

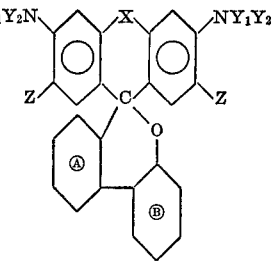

wherein X represents an oxygen atom or a sulphur atom, $Y_1$ and $Y_2$, which may be the same or different, each represents a low molecular weight alkyl, phenyl or tolyl radical and Z represents a hydrogen atom or a low molecular weight alkyl group, and wherein the benzene rings A and B may be substituted by a low molecular weight alkyl group, a halo group or a sulphonic acid group.

2. A compound as claimed in claim 1, wherein $Y_1$ and $Y_2$, which may be the same or different, each represents a low molecular weight alkyl radical.

3. A compound as claimed in claim 2, wherein at least one of $Y_1$ and $Y_2$ represents a methyl group.

4. A compound as claimed in claim 1, wherein Z represents a low molecular weight alkyl group.

5. A compound as claimed in claim 1, wherein Z represents a hydrogen atom.

6. A compound as claimed in claim 1, wherein the benzene rings A and B are unsubstituted.

7. A compound of Formula 2

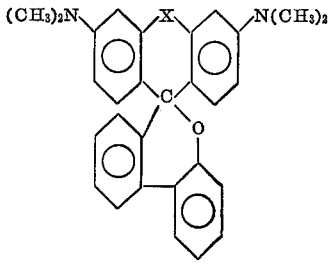

(2)

wherein X represents an oxygen atom or a sulphur atom.

References Cited

UNITED STATES PATENTS 3,442,908  5/1969  Orita et al. _____ 260—335

HENRY R. JILES, Primary Examiner

C. M. S. JAISLE, Assistant Examiner

U.S. Cl. X.R.

73—356; 116—114 V; 260—335